US007769858B2

(12) United States Patent
Corl, Jr. et al.

(10) Patent No.: US 7,769,858 B2
(45) Date of Patent: Aug. 3, 2010

(54) METHOD FOR EFFICIENTLY HASHING PACKET KEYS INTO A FIREWALL CONNECTION TABLE

(75) Inventors: Everett Arthur Corl, Jr., Raleigh, NC (US); Gordon Taylor Davis, Chapel Hill, NC (US); Clark Debs Jeffries, Chapel Hill, NC (US); Steven Richard Perrin, Raleigh, NC (US); Hiroshi Takada, Yamato (JP); Victoria Sue Thio, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 11/063,950

(22) Filed: Feb. 23, 2005

(65) Prior Publication Data

US 2006/0190613 A1 Aug. 24, 2006

(51) Int. Cl.
*G06F 15/173* (2006.01)
(52) U.S. Cl. ...................................... 709/225; 709/229
(58) Field of Classification Search ............ 370/395.32; 707/E17.052; 711/216, 217, E12.06; 709/202, 709/203, 232, 238, 242, 245, 224; 713/181; 726/11–13
See application file for complete search history.

(56) References Cited

U.S. PATENT DOCUMENTS

| | | | |
|---|---|---|---|
| 6,034,958 A | 3/2000 | Wicklund | 370/395 |
| 6,064,736 A | 5/2000 | Davis et al. | 380/21 |
| 6,212,183 B1 | 4/2001 | Wilford | 370/392 |
| 6,510,509 B1 * | 1/2003 | Chopra et al. | 712/13 |
| 2002/0016826 A1 * | 2/2002 | Johansson et al. | 709/207 |
| 2002/0114333 A1 * | 8/2002 | Xu et al. | 370/392 |
| 2002/0116527 A1 | 8/2002 | Chen et al. | 709/245 |
| 2002/0120760 A1 | 8/2002 | Kimchi et al. | 709/230 |
| 2002/0199095 A1 | 12/2002 | Bandini et al. | 713/151 |
| 2003/0196095 A1 | 10/2003 | Jeffries et al. | 713/181 |
| 2003/0200441 A1 | 10/2003 | Jeffries et al. | 713/181 |
| 2004/0240447 A1 * | 12/2004 | Dorbolo et al. | 370/392 |

OTHER PUBLICATIONS

V. Srinivasan et al., "Packet Classification Using Tuple Space Search", Dept of Computer Science, Washington University in St. Louis, 1999.
V. Srinivasan et al., "Fast and Scalable Layer Four Switching", SIGCOMM '98 Vancouver B.C., 1998.
Dan Decasper et al, "Router Plugins: A Software Architecture for Next-Generation Routers", IEEE/ACM Transactions on Networking, vol. 8, No. 1, Feb. 2000.
Duan Hai-xin et al, "Policy-based access control framework for large networks", Journal of Software 12, No. 12, (Dec. 2001): 1739-46.
P. Warkhede et al., "Fast Packet Classification for two-dimensional conflict-free filters", IEEE INFOCOM 2001. vol. 3, pp. 1434-1443 vol. 3.

* cited by examiner

*Primary Examiner*—John Follansbee
*Assistant Examiner*—Madhu Woolcock
(74) *Attorney, Agent, or Firm*—Yee & Associates, P.C.; Mark E. McBurney

(57) ABSTRACT

A method for increasing the capacity of a connection table in a firewall accelerator by means of mapping packets in one session with some common security actions into one table entry. For each of five Network Address Translation (NAT) configurations, a hash function is specified. The hash function takes into account which of four possible arrival types a packet at a firewall accelerator may have. When different arrival types of packets in the same session are processed, two or more arrival types may have the same hash value.

14 Claims, 15 Drawing Sheets

500

Type 2: NAT on Client interface only

Type 3: NAT on Server interface only

Type 4: NAT on Client and Server interfaces

Type 5: NAT in Firewall

METHOD FOR EFFICIENTLY HASHING PACKET KEYS INTO A FIREWALL CONNECTION TABLE

BACKGROUND OF THE INVENTION

1. Technical Field

The present invention relates to computer networks in general and, in particular, to design and operation of firewalls. It includes description of efficient hash functions that map packet header keys into a firewall connection table, thereby increasing the capacity of the table.

2. Prior Art

The worldwide web (WWW) better known as the Internet is fast becoming the premier computer network for communicating both private and public information. The Internet is an open network that can be accessed by anyone using primarily a protocol called TCP/IP (Transmission Control Protocol/Internet Protocol) or other protocols. Because of its openness computers on private networks (intranets) are susceptible to malicious attacks by hackers. Computers have become the main instrument of communication for business and government agencies. For example, many business and government agencies use computers and computer networks to link remote offices, share data and other resources among employees within an office or campus, communicate with customers via electronic mail, reach new customers via electronic mail, provide information via web sites, etc.

Because businesses, governments and individuals rely heavily on computers and the Internet, malicious attacks could result in catastrophic economic loss or embarrassment. As a consequence computer security has become a major concern of business, government and individuals using the computer as a major communication vehicle.

A firewall is a set of logical functions, mainly related to security, that are implemented on a box in a computer network. The firewall may run on a dedicated electronic device, as a set of functions that complement other functions on a box such as a router, as a set of functions on a server, laptop, or workstation, or on some other network device. Firewalls may keep a table of labels of packets known to be part of a stream of packets in a TCP session (many packets that comprise a communication). Such a connection table may reduce the workload of a firewall or increase its performance in the following way. Often, when a TCP session starts, firewall software is called into play to analyze the initial packets. The analysis may yield a decision about whether or not to permit the session to continue in light of security policies. If a decision is reached, then the header values common to all packets of the session may be stored in memory together with the decision. In this way, it is not necessary for firewall software to be called over and over for every subsequent packet of a session. Rather, the packet header key may be sought in the connection table, and, if found, a stored action or decision enforced.

The connection table may be considered to be within a firewall accelerator, meaning a set of functions that enhance the speed or performance of a firewall.

Modern communications may include analysis of many thousands of TCP sessions at one point in a network. If a connection table is to be used as above, then it may happen that the large number of connections sometimes occurring will exceed the storage capacity of the table. It is desirable, therefore, to make efficient use of the table. The goal is to map all the packets of one session (with one, common action) to the smallest number of distinct table entries or slots.

Operation of connection tables can be complicated by the use of Network Address Translation (NAT). NAT is described by the Internet Engineering Task Force (IETF) in a Request For Comment (RFC) number 3022. RFC 3022 is available at http://www.ietf.org/rfc/rfc3022.txt?number=3022

NAT may change some header values in the packets of one session. This may make mapping all the packets of one session to one table slot variable according to the various means of applying NAT in a network.

A hash function is a mathematical function applied to the distinguishing header values of a packet. The input therefore is the ordered concatenation of bits from one or more packet headers (typically four header fields, as explained below). The output of a hash function is generally a smaller number of bits. The smaller number can be used as an index or label of a table slot.

When a packet arrives at the network device containing the firewall function, it must be recognized. To accomplish lookup of a packet in the connection table, a hash function is applied to its headers, collectively constituting a key. The hash function may be simple (selection of some key bits) or complex (a mathematical function applied to some or all key bits). The value of the hash function is an index into the lookup table. Each slot in the table is indexed, for example, by using all the binary numbers of length 16 from 0000000000000000 through 1111111111111111.

The index (hash function output) derived from an item may point to a memory location with zero, exactly one, or more than one stored (cached) memory. Since the table slot is found by direct application of the hash function, the table is called a Direct Table (DT).

If the DT memory location has stored zero memories, then there is a miss and a new memory with new action must be added to the lookup system. If there is exactly one stored memory for the table slot, then the table points to the one stored memory. The full key is then compared to a full key stored value. If there is a match, then the action stored with the memory is applied. If there is not a match, then there is a miss. Again, in case of a miss, the new memory and its new action must be added to the lookup mechanism. If there are two or more memories with the hit DT slot index, then the full key of the item may be analyzed by an attached Patricia tree (see D. Knuth, The Art of Computer Programming, Addison-Wesley, Reading Mass., 2nd ed, 1998, vol 3, p 498). The Patricia tree is attached in the sense that the DT slot contains a pointer to it. The Patricia tree contains at least one branch. Also, the two or more memories appear as leaves of the Patricia tree. The Patricia tree tests key bits until at most one stored memory might fit the item. The full item key is then compared with the stored key in memory. If there is a match, then the stored action is applied. If there is not a match, then there is again a miss. Then the key and its action may be stored as a new memory in the connection table.

Prior art includes using different hash values for related packets that have different direction and different NAT processes, even though many action types would be common to all. This would consume in general a different table slot for each combination. Therefore, an alternate technique to map the closely related keys of one session into a common table slot and Patricia tree leaf is needed.

SUMMARY OF THE INVENTION

Four kinds of packets can arrive at a firewall accelerator. The arrival types are:
1. from client to server
2. from server to client 3. from firewall to client
4. from firewall to server There are five options for Network Address Translation (NAT) in a firewall (see RFC 3022). The NAT types are:
1. no NAT
2. NAT on client interface only
3. NAT on server interface only
4. NAT on both client interface and server interface
5. NAT in firewall Depending upon the NAT type of a firewall accelerator and the arrival type of a packet, the identification of the packet can be related to another packet with a different arrival type by a relationship called herein swap. A TCP packet has a Source Address (SA), Destination Address (DA), Source Port (SP), and Destination Port (DP).

In prior art, the values A, 1, B, 2 of a typical packet, plus the TCP protocol number=6 are typically all fed to a hash function for lookup in a table. In general, the set of values SA, SP, DA, DP, and protocol number (=6 for TCP, =17 for User Datagram Protocol (UDP)) of a packet is called the IP five-tuple of the packet. The focus in the present invention is on the first four values, the four-tuple (since TCP is the assumed protocol). Let these fields be ordered as packet headers=(SA, SP, DA, DP)

Together these fields comprise the key used in a firewall connection table. If a certain packet has entries A, 1, B, 2, then A denotes an IP address (32 bits), 1 denotes a SP (16 bits), B denotes another IP address (32 bits), and 2 denotes another DP (16 bits). Let us define the reflection of the key of the packet to be the key of any other TCP packet with header values B, 2, A, 1. That is, let R=reflection function that takes a TCP four-tuple and gives a TCP four-tuple. R can be denoted

R(A, 1, B, 2)=(B, 2, A, 1)

Note that R(R(A, 1, B, 2))=(A, 1, B, 2), that is, the reflection of a reflection is the original key.

In TCP without NAT a packet that is a reflection of another packet is simply a packet in the "opposite" direction of the TCP connection (client to server versus server to client).

One purpose of the present invention is to disclose a new type of hash function that efficiently packs TCP headers and their reflections into a table.

The present invention is a Step between the raw header values (four-tuple) and any conventional hash of the four-tuple and additional fields such as protocol. The Step is denoted as a function S(A, 1, B, 2). The step S is defined as follows.

If A and B are the SA and DA and if A as a 32-bit integer is above the value of B as a 32-bit integer, then S does nothing. Otherwise, S is the reflection. That is, Definition of Step Operation:
If A>B, then S(A, 1, B, 2)=(A, 1, B, 2)
else S(A, 1, B, 2)=R(A, 1, B, 2)=(B, 2, A, 1)

The benefits of the invention vary according to arrival type and NAT type. The benefits will become apparent in the following description, to be outlined in order of the above five NAT types.

1. No NAT

In this case traffic arrival types are related as follows (showing only the relevant four entries of the five-tuple):
1. client to server=(A, 1, B, 2)
2. server to client=R(A, 1, B, 2)=(B, 2, A, 1)
3. firewall to client=R(A, 1, B, 2)=(B, 2, A, 1)
4. firewall to server=(A, 1, B, 2)

Each packet must be marked by two bits designating which of the four arrival types it is. However, if the hash H is applied after the step S, then the four hash values are all the same. In other words, all four packets take only one Direct Table (DT) slot. Using the two bits and the step S loses no information. Therefore the lookup after the DT can find a leaf with information common to both directions and arrival types and then use the two bits to point to a second leaf with information specific to the direction of the packet at hand.

2. NAT on Client Interface Only

In this case traffic arrival types are related as follows (showing only the relevant four entries of the five-tuple):
1. client to server=(A, 1, B, 2)
2. server to client=(C, 3, A, 1)
3. firewall to client=(C, 3, A, 1)
4. firewall to server=(A, 1, C, 3)

Each packet must be marked by two bits designating which of the four arrival types it is, and of course the NAT type for the box is known. If the hash H is applied after the step S, then the three hash values for arrival types 2, 3, 4 are the same. In other words, the four packet types take two Direct Table (DT) slots. Using the two bits and the step S loses no information. Therefore the lookup after the DT for types 2, 3, 4 can find a leaf with information common to both directions and then use the two bits to point to a second leaf with information specific to the direction of the packet at hand.

3. NAT on Server Interface Only

In this case traffic arrival types are related as follows (showing only the relevant four entries of the five-tuple):
1. client to server=(A, 1, B, 2)
2. server to client=(C, 3, A, 1)
3. firewall to client=(B, 2, A, 1)
4. firewall to server=(A, 1, B, 2)

Each packet must be marked by two bits designating which of the four arrival types it is, and of course the NAT type for the box is known. If the hash H is applied after the step S, then the three hash values for arrival types 1, 3, 4 are the same. In other words, the four packet types take two Direct Table (DT) slots. Using the two bits and the step S loses no information. Therefore the lookup after the DT for types 1, 3, 4 can find a leaf with information common to both directions and then use the two bits to point to a second leaf with information specific to the direction of the packet at hand.

4. NAT on Both Client Interface and Server Interface

In this case traffic arrival types are related as follows (showing only the relevant four entries of the five-tuple):
1. client to server=(A, 1, B, 2)
2. server to client=(D, 4, A, 1)
3. firewall to client=(C, 3, A, 1)
4. firewall to server=(A, 1, C, 3)

Each packet must be marked by two bits designating which of the four arrival types it is, and of course the NAT type for the box is known. If the hash H is applied after the step S, then the two hash values for arrival types 3, 4 are the same. In other words, the four packet types take three Direct Table (DT) slots. Using the two bits and the step S loses no information. Therefore the lookup after the DT for types 3, 4 can find a leaf with information common to both directions and then use the two bits to point to a second leaf with information specific to the direction of the packet at hand.

5. NAT in Firewall

In this case traffic arrival types are related as follows (showing only the relevant four entries of the five-tuple):
1. client to server=(A, 1, B, 2)
2. server to client=(C, 3, D, 4)

3. firewall to client=(B, 2, A, 1)
4. firewall to server=(D, 4, C, 3)

Each packet must be marked by two bits designating which of the four arrival types it is, and of course the NAT type for the box is known. If the hash H is applied after the step S, then the two hash values for arrival types 1, 3 are the same. Also, the two hash values for arrival types 2, 4 are the same. In other words, the four packet types take two Direct Table (DT) slots. Using the two bits and the step S loses no information. Therefore the lookup after the DT for types 1, 3 can find a leaf with information common to both directions and then use the two bits to point to a second leaf with information specific to the direction of the packet at hand. The same holds for types 2, 4.

Thus invention can be used by hashing the SA, SP, DA, DP to a Direct Table (DT), then testing bits to get to a leaf associated with values A, 1, B, 2 or B, 2, A, 1 or others according to NAT type. The action of the leaf includes actions common to both arrival types. The action of the leaf also includes using the two arrival type bits to point to information or further actions specific to the arrival type.

Assembly code that implements part of the present invention is shown in the Appendix.

Further features and advantages of the invention as well as the structure and operation of various embodiments of the invention are described in detail below with reference to the accompanying figures.

DETAILED DESCRIPTION OF EMBODIMENTS

Figure 1:
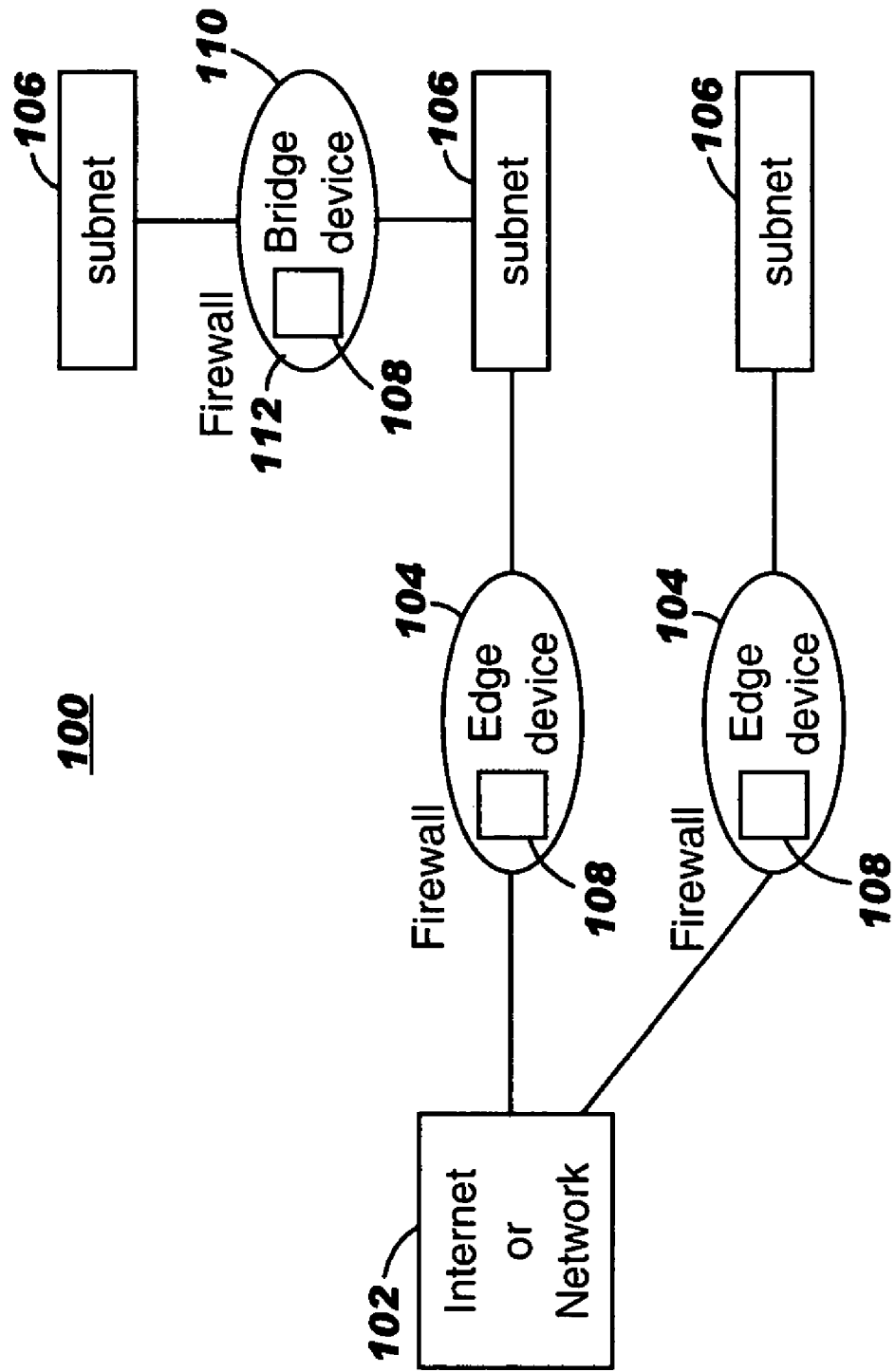
FIG. 1 shows high level block diagram of a network and in particular some potential logical locations to position the present invention as a firewall accelerator supporting a firewall.

FIG. 1 shows a highly simplified network 100 in which the connection table mechanism of the present invention could be implemented within the firewall accelerator within each firewall 108. The Internet or other network 102 connects to Edge devices 104. Each edge device might or might not contain an instance of a firewall 108. Edge devices also connect subnets 106. In turn, two subnets might be connected by a Bridge device 110. A Bridge device might or might not contain an instance of a firewall 108. Because Edge devices, subnets and Bridge devices are well known in the prior art, further discussion of these entities will not be given.

Figure 2:
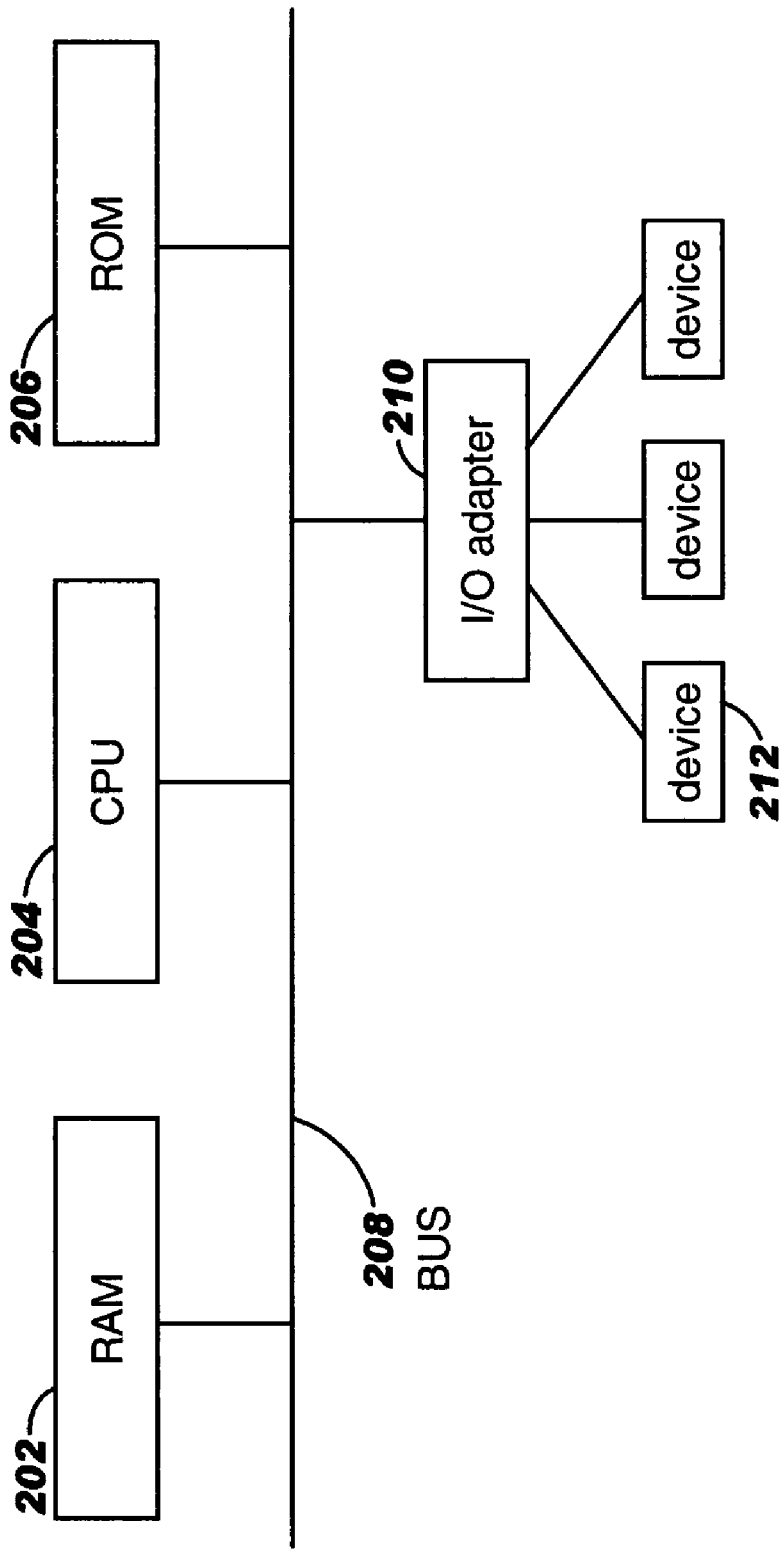
FIG. 2 shows high level block diagram of components needed to implement the present invention.

FIG. 2 shows a block diagram for one embodiment of hardware 200 used with a connection table within a firewall accelerator within a firewall, which is labeled 108 in FIG. 1. Random Access Memory (RAM) 202 stores updates of information as included in the present invention. A Central Processing Unit (CPU) 204 has access to data stored at configuration in Read Only Memory (ROM) 206 to implement the algorithms of the present invention set forth herein and thereby update RAM. A Bus 208 is provided for communication of signals among the components. An Input/Out put (I/O) adapter 210 manages signaling to and from external devices 212. The I/O adapter 210 might include a general purpose computer with monitor observed periodically by a human administrator. One of the devices 212 could be a device such as an adapter that detects packets on the network and forwards the packets to the CPU for further processing according to teachings of the present invention.

In an alternate embodiment the device 212 could be a special purpose computer such as the PowerNP developed and marketed by IBM. The PowerNP is a network processor that includes an Embedded Processor Complex (EPC) containing a plurality of processors that performs the necessary function to enable routing of a packet within a network. The PowerNP also includes storage in which the session or connection information according to the teachings of the present invention could be stored. In addition, the algorithms described herein could be executed in the EPC. A more detailed description of the PowerNP is set forth in U.S. Pat. No. 6,404,752 which is incorporated herein in its entirety.

Figure 3:
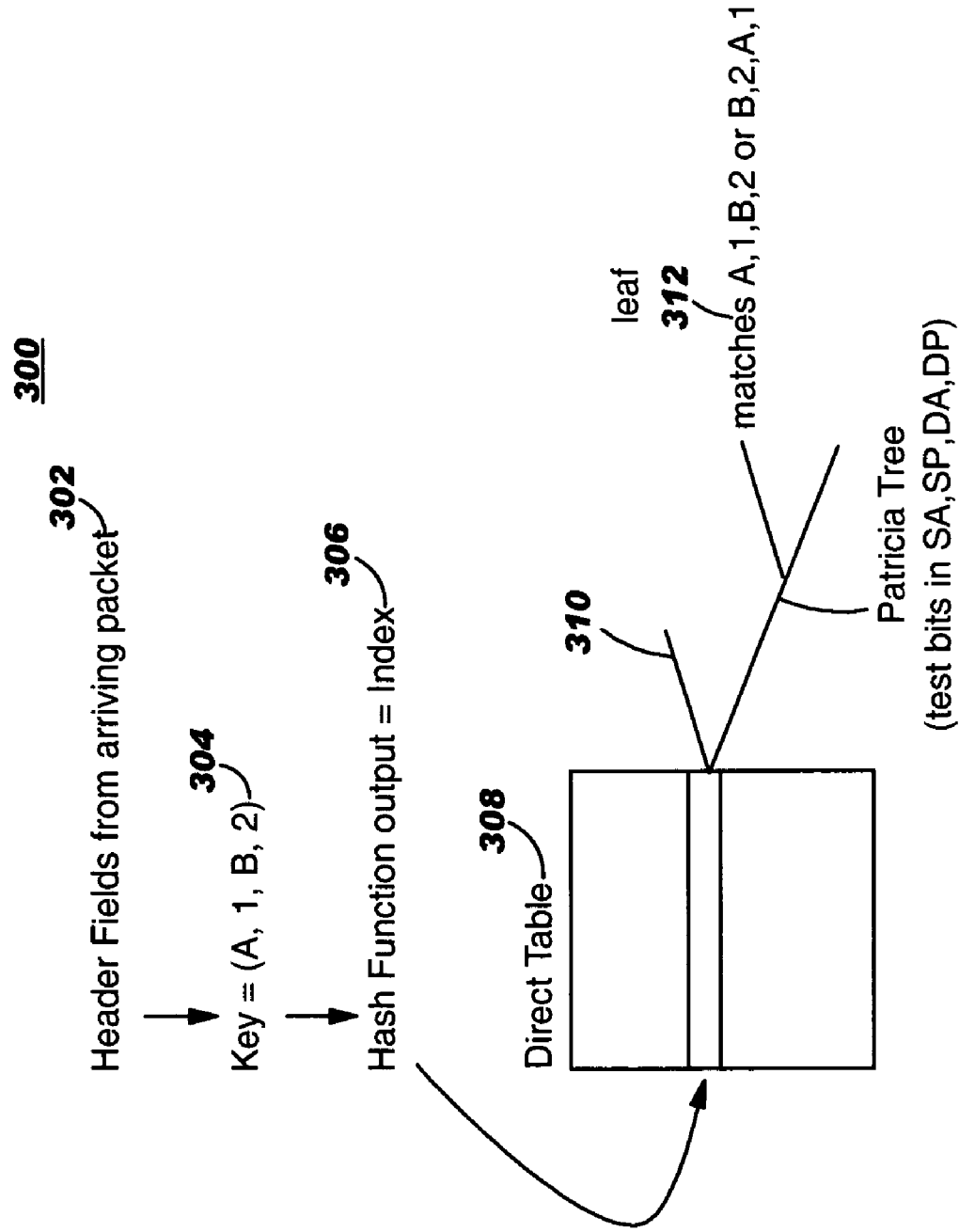
FIG. 3 shows a high level diagram of a lookup mechanism as used as a connection table in a firewall accelerator and as made more efficient by the present invention.

FIG. 3 shows the components of a typical lookup mechanism 300. First header fields are extracted 302 from the packet. Then a key 304 is built using values in the headers. In the present invention, focus is on a key commonly known as the four-tuple and consisting of the Source Address (SA), the Source Port (SP), the Destination Address (DA), and the Destination Port (DP), denoted respectively in 304 by the symbols A, 1, B, 2. A hash function hash the key as input and an index as output 306. The index is also a label of a slot in a Direct Table 308. The slot can point to exactly one or several memory locations through a Patricia Tree 310. The well-known function of the Patricia tree is to use bits in the key to find a leaf match 312. At the leaf 312, the full key A, 1, B, 2 is compared to a stored value of A, 1, B, 2 or B, 2, A, 1.

Figure 4:
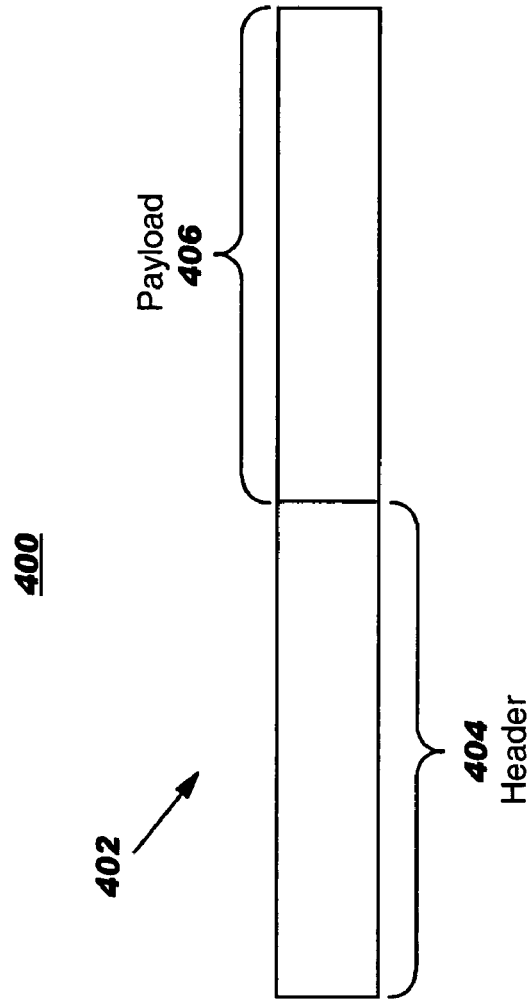
FIG. 4 shows the general arrangement of header and payload in a packet.

FIG. 4 shows a graphical representation 400 of packet or frame 402 which includes a header portion 404 and a payload section 406. The general packet format is well known in the prior art. Therefore, only the portion of the format which relates to the present invention will be discussed herein. The portion of the format which is relevant to the present invention is the header 404. The header section 404 includes both an IP header and a TCP header.

Figure 5:
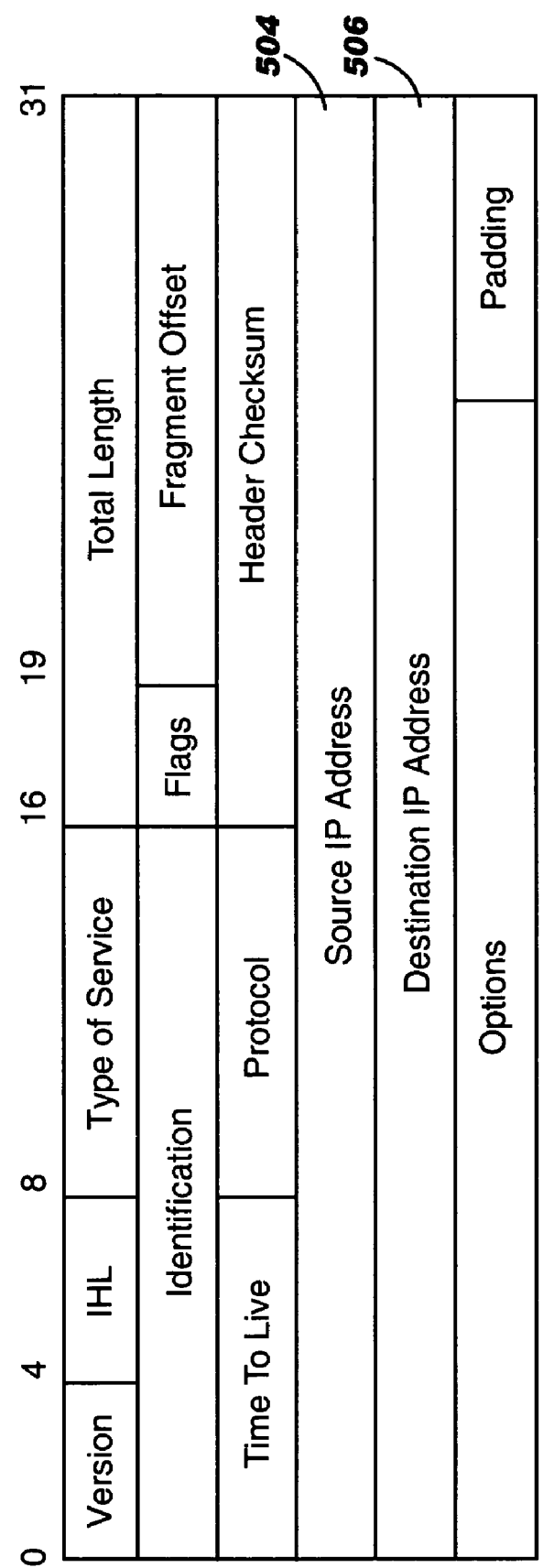
FIG. 5 shows the structure of an Internet Protocol (IP) packet with special reference to Source Address and Destination Address fields.

FIG. 5 shows a format 500 for the IP portion of the header. As defined by the Internet Engineering Task Force (IETF), the IP format is well known in the prior art. Therefore, only the fields in the header that are relevant to the present invention will be described. The fields of interest are IP Source Address (32 bits) and IP Destination Address (32 bits).

Figure 6:
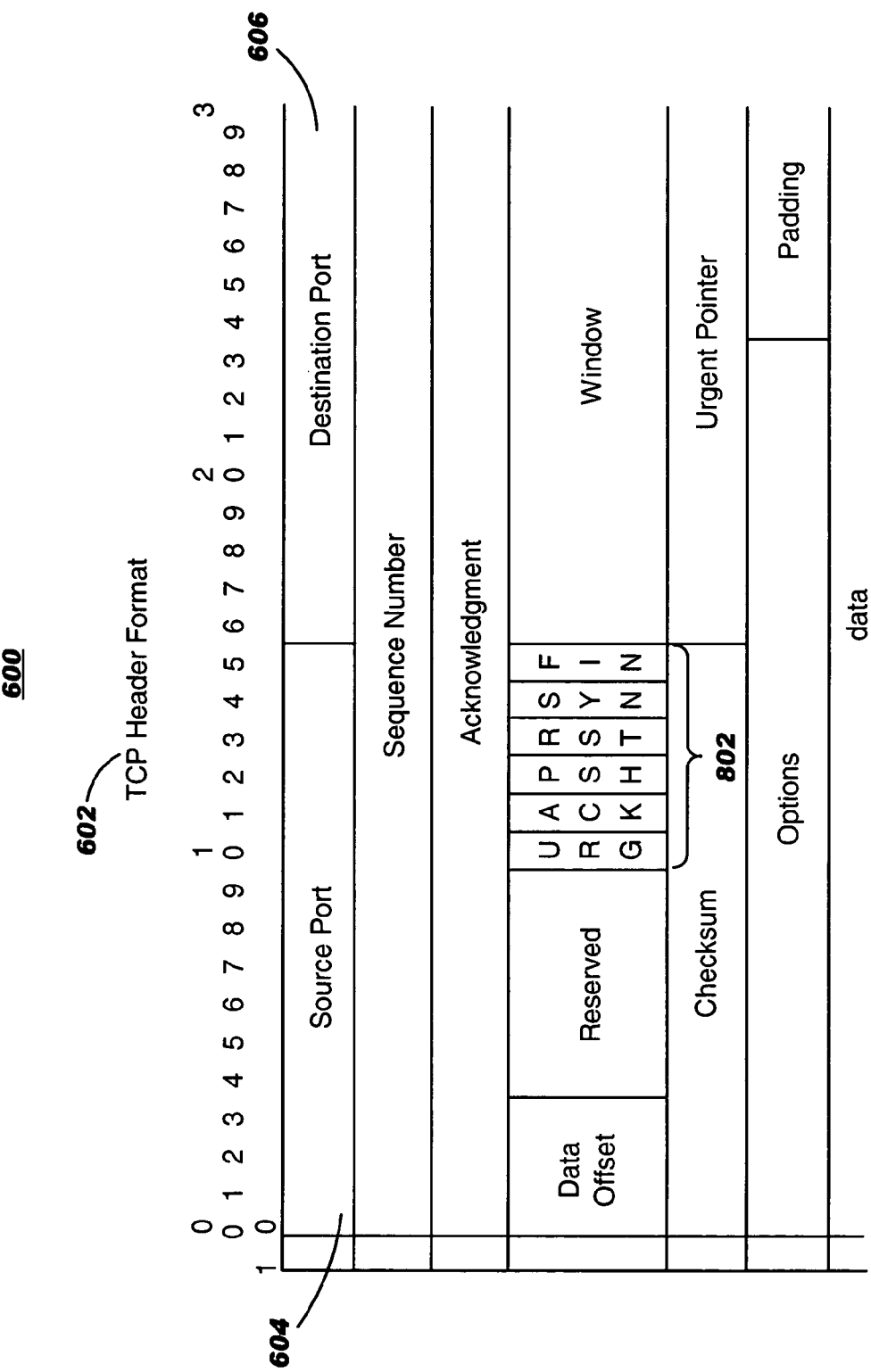
FIG. 6 shows the structure of an Transmission Control Protocol (TCP) packet with special reference to Source Port and Destination Port fields.

FIG. 6 shows TCP format 600. The TCP format 600 contains many fields as shown 602 and is well known in the prior art. Therefore, only the portions or fields of the header that are of interest to the present invention will be discussed herein. The relevant fields of the TCP format are: Source Port (16 bits) 604 and Destination Port (16 bits) 606.

Figure 7:
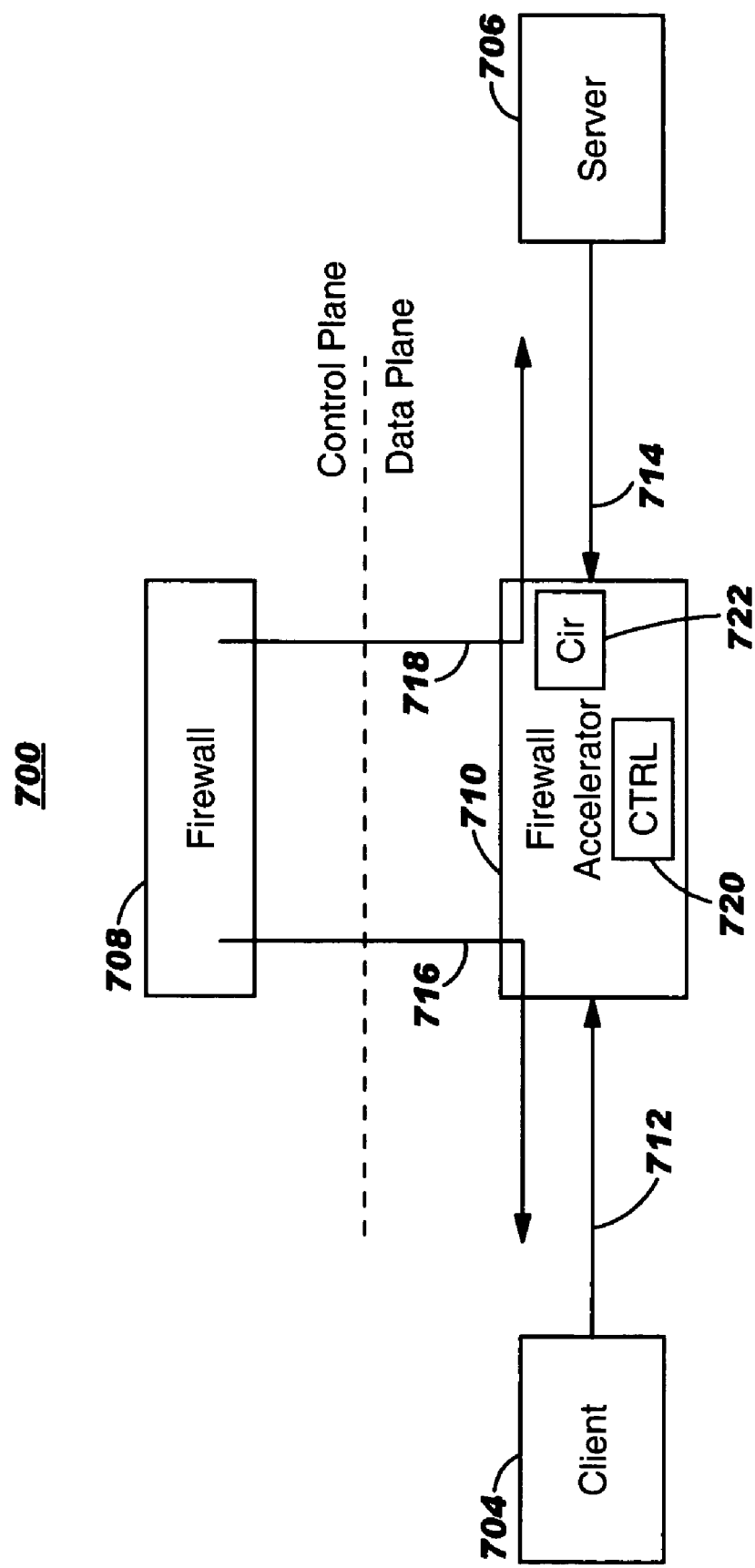
FIG. 7 shows the logical arrangement of Client, Server, Firewall, and Firewall Accelerator, with identification of four arrival types of packets arriving at the Firewall Accelerator.

FIG. 7 shows the logical arrangement 700 of Client 704, Server 706, Firewall 708, and Firewall Accelerator 710. Also shown are four arrival types of packets arriving at the Firewall Accelerator. The four arrival types are from the Client 712, from the Server 714, from the Firewall and destined to the Client 716, and from the Firewall and destined to the Server 718. For explanation purposes FIG. 7 maybe logically positioned into control plane and date plan. The firewall which could be a general purpose computer executing code to provide desired functions, such as security, is partitioned in the control plane, whereas the client, Firewall accelerator and server are positioned in the date plane. With this configuration once the Firewall approves a request—presented by the Client—for access to the server, execution of the request including session establishment, flows etc. is carried out by the Firewall accelerator. By so doing exchange of information from Server to Client and vice versa is carried out at media speed. Because device 710 facilitates speed it is termed or called Firewall Accelerator. The Firewall accelerator includes control (ctrl) 720 and associated circuits (cir) 722. The ctrl and cir provide the resources needed to expedite communication between client and server. The PowerNP discussed above could be used as one type of controller. Other types of controllers could be used to carry out the teachings of the present invention.

Figure 8:
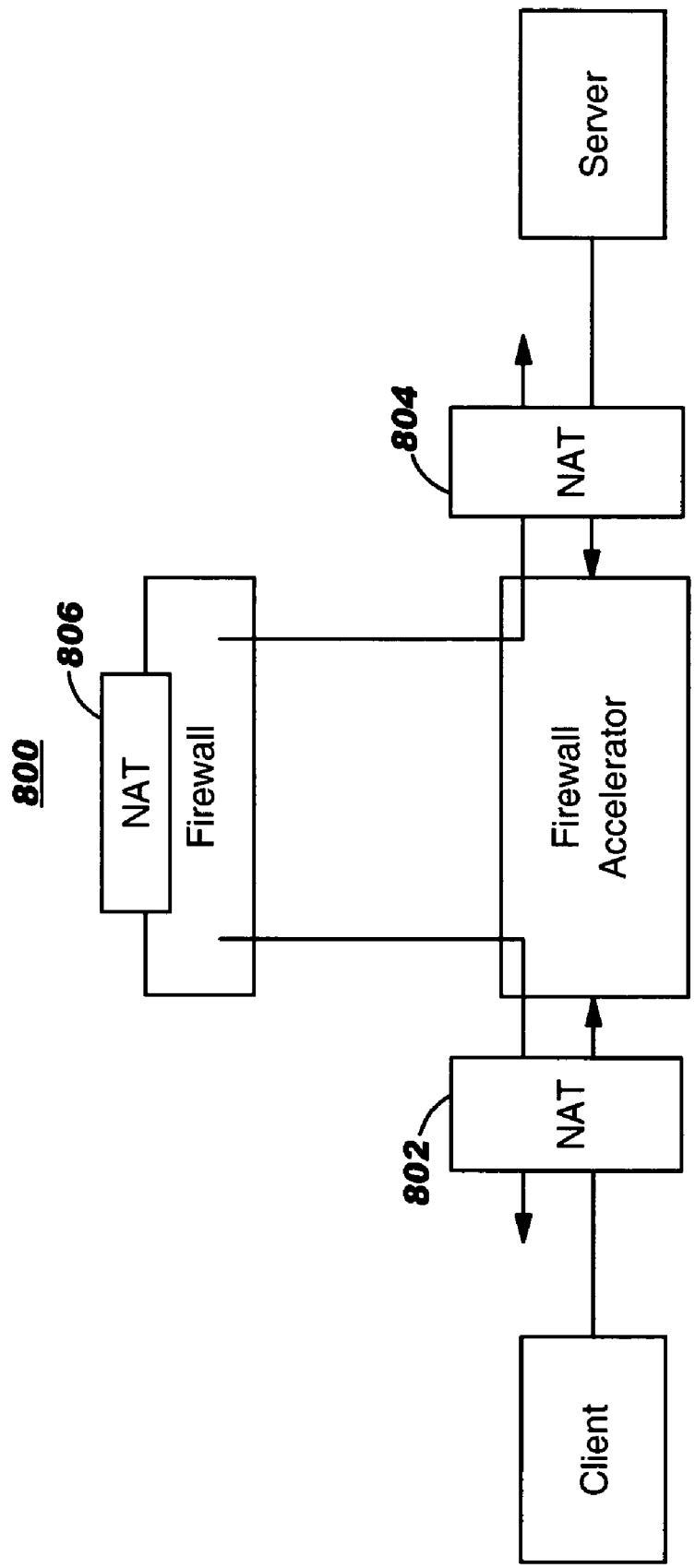
FIG. 8 shows the potential placement of Network Address Translation (NAT) functions (none or one or more may be present) relative to Firewall and Firewall Accelerator.

FIG. 8 shows the potential placement 800 of Network Address Translation (NAT) functions (none or one or more may be present) relative to Firewall and Firewall Accelerator. Shown are NAT on the Client side 802, NAT on the Server side 804, and NAT on the Firewall 806.

Figure 9:
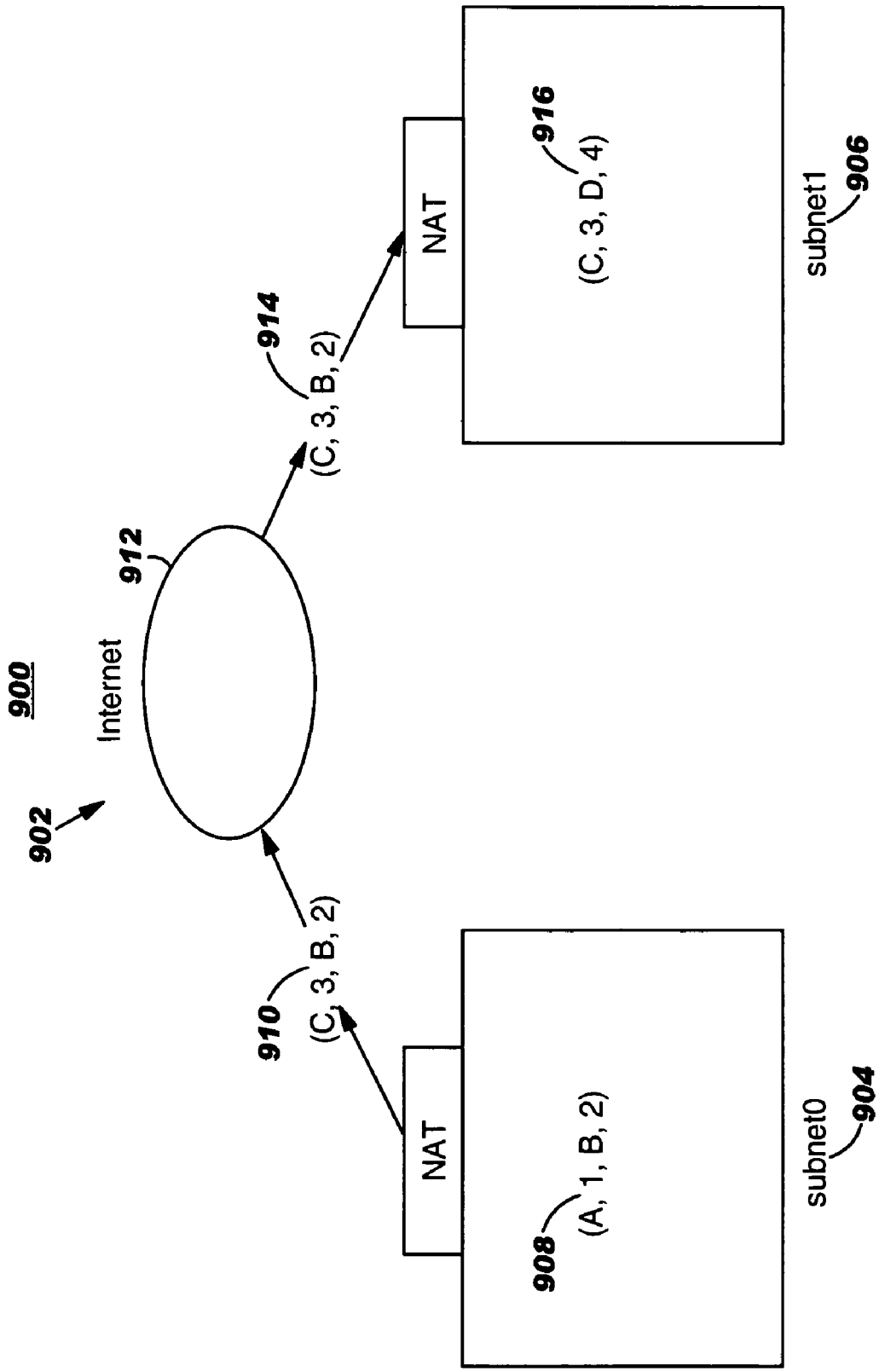
FIG. 9 shows the NAT mechanism effects in the Internet.

FIG. 9 shows the NAT mechanism effects 900. The relative logical effect 902 of NAT on a typical packet is shown. A packet is generated in subnet0 904, destined for subnet1 906. The packet is identified by its four-tuple (A, 1, B, 2) 908 as described above for FIG. 3. As the packet passes through NAT 910 leaving subnet0, its Source Address is changed from A to C and its Source Port is changed from 1 to 3 (as in FIG. 3, A, B, C, 1, 2, 3 are symbols representing the full field values). Then the packet may pass through the Internet 912. Then the packet may arrive at a NAT mechanism 914 at the edge of subnet1, whereupon the Destination Address and the Destination Port of the packet are changed. The changes may be to a Destination Address of D and a Destination Port of 4 916, again with D and 4 merely being symbols representing the new field values.

Figure 10:
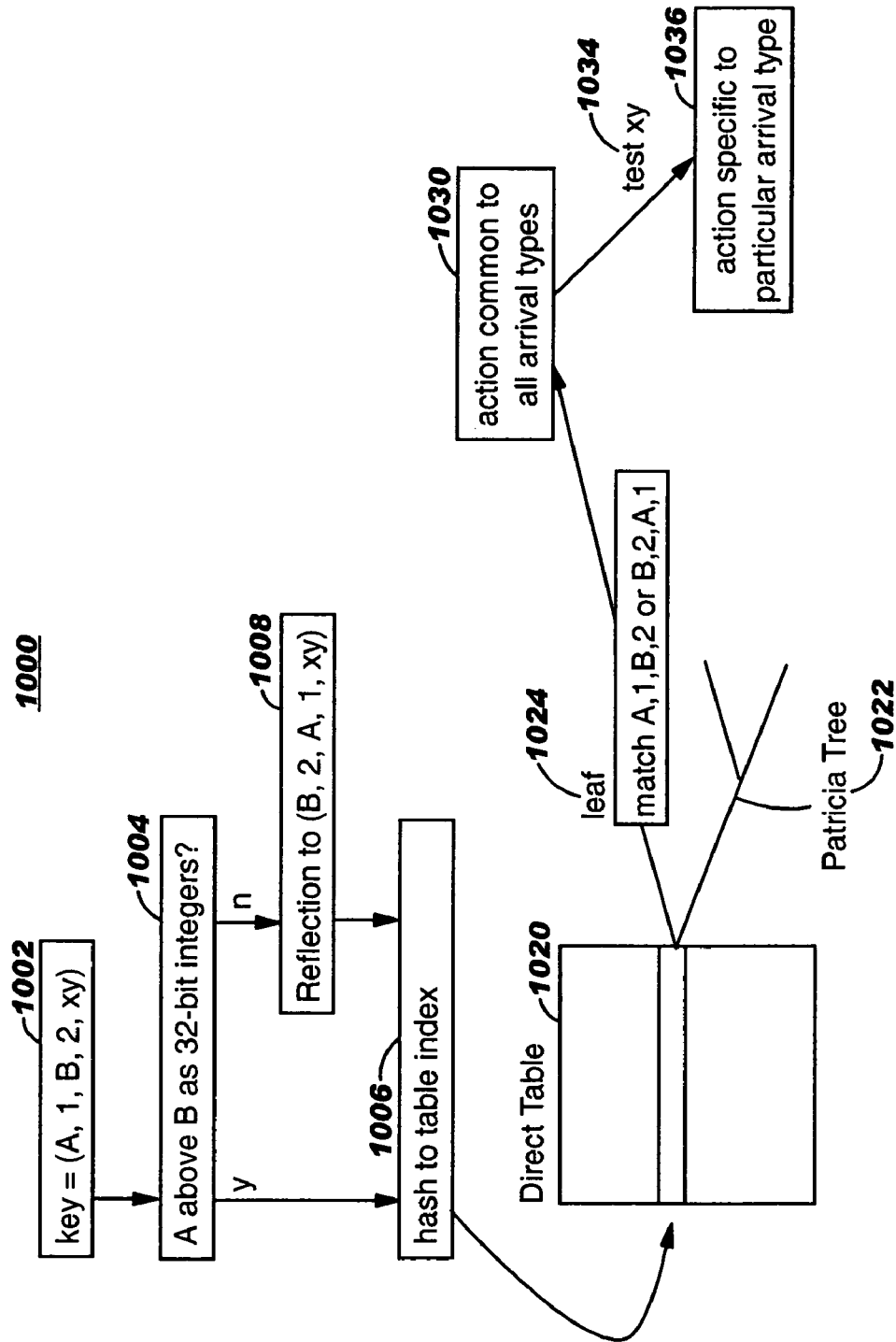
FIG. 10 shows the logical arrangement of components, with no NAT, in lookups and in particular the logical placement of the hash function included in the present invention.

FIG. 10 shows the logical arrangement 1000 of components involved in lookups and in particular the logical placement of the hash function included in the present invention. It shows a preferred embodiment involving a Direct Table 1020 and Patricia Tree 1022, as now described. Other type of look-up mechanism as discussed relative to FIG. 11 can be used without departing from teachings of the present invention. A key consisting of the four-tuple A, 1, B, 2 used in FIG. 3 is concatenated with two additional bits xy 1002. The two bits xy designate and encode the identity of the arrival type (one of four possibilities as shown in FIG. 7). A test mechanism 1004 compares field entries A and B to determine which is above the other. If A is above (greater than, >) B, then the key is passed to a hash function mechanism 1006. If A is not above B, then the key is passed to a Reflection Step that converts it from A, 1, B, 2, xy to B, 2, A, 1, xy. Then the key is passed to the hash function mechanism 1006. The hash function in 1006 has as input either A, 1, B, 2 or B, 2, A, 1. The two bits xy are not inputs to the function, but xy are needed in the final leaf compare 1034. The output of the hash function is an index into a slot in a Direct Table 1020. The slot then points to a Patricia Tree 1022 (possibly consisting of only one Leaf, or possibly having branches and multiple leaves as shown). The Patricia Tree is walked using known technique to deduce the one leaf that the four-tuple or its reflection might match. An unsuccessful test for match leads to revision of the tree. A successful test for match points first to actions common to all arrival types 1030. Then the two bits xy are further tested to determine arrival type 1034. The test finally points to additional actions particular to the arrival type 1036.

Figure 11:
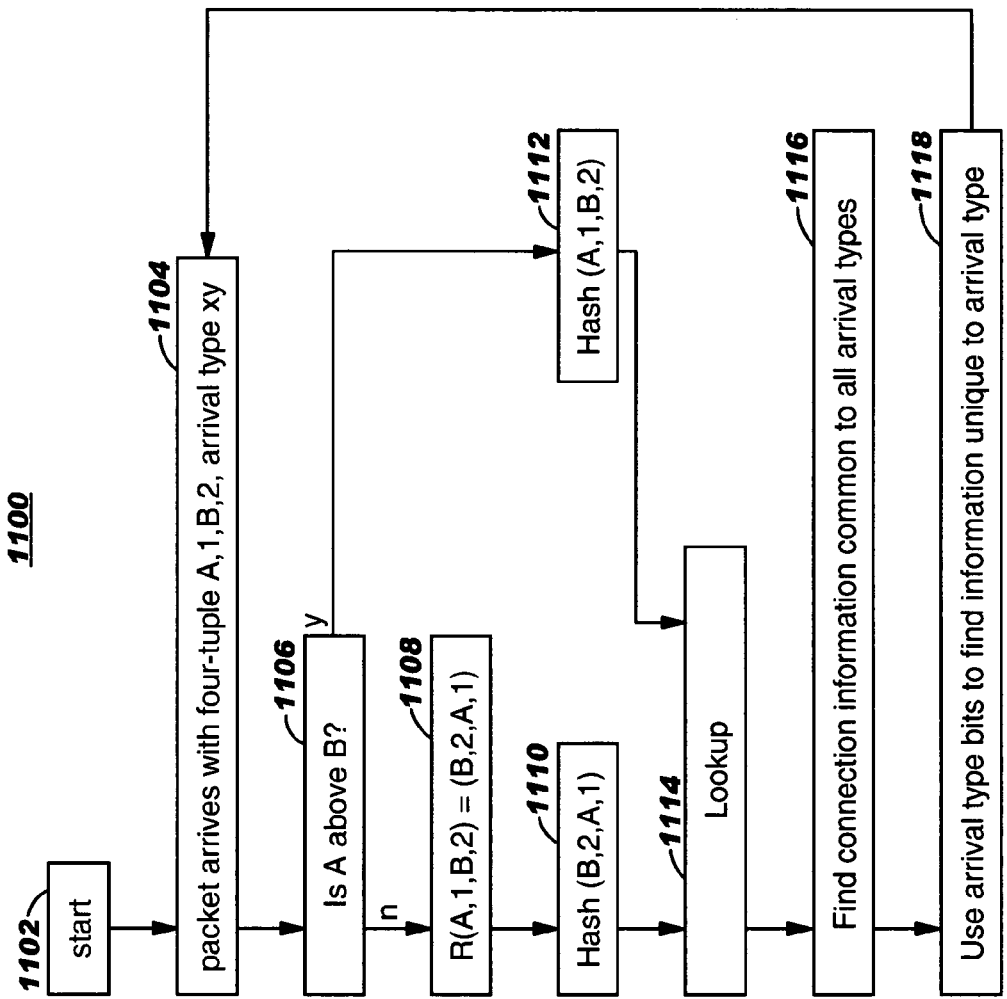
FIG. 11 shows a flowchart for processing packets, with NAT on Client interface only, in a lookup mechanism as taught by the present invention.

FIG. 11 shows a flowchart 1100 for processing packets in a lookup mechanism as taught by the present invention. The start 1102 is followed by the arrival of packet with four-tuple A, 1, B, 2 and arrival type bits xy 1104. A mechanism determines whether or not Source Address A is above Destination Address B 1106. If A is not above B, then the system branches to a Reflection Step 1108. Then B, 2, A, 1 is fed to a Hash function 1110. If A is above B, then A, 1, B, 2 is fed to the same Hash function in 1112. The output in either case goes to the lookup mechanism 1114, which may be a Direct Table and Patricia Tree or may be some other lookup mechanism. The lookup mechanism finds first connection information common to all four arrival types, of arrival traffics (FIG. 7) 1116. Then the arrival type bits xy are tested and further actions as determined by arrival type may be applied 1118. Then the system considers the next packet 1104.

Figure 12:
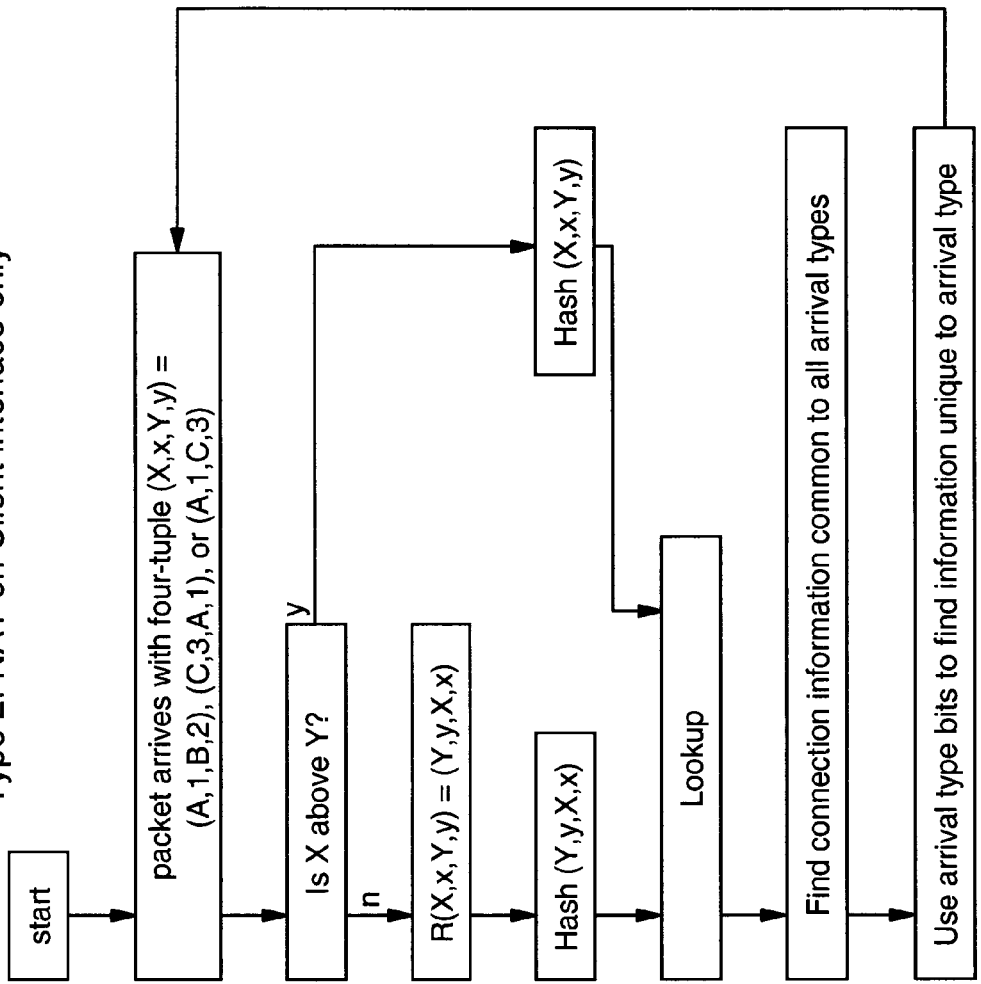
FIG. 12 shows a flowchart for processing packets, with NAT on Client interface only, in a lookup mechanism according to teachings of the present invention.
Figure 13:
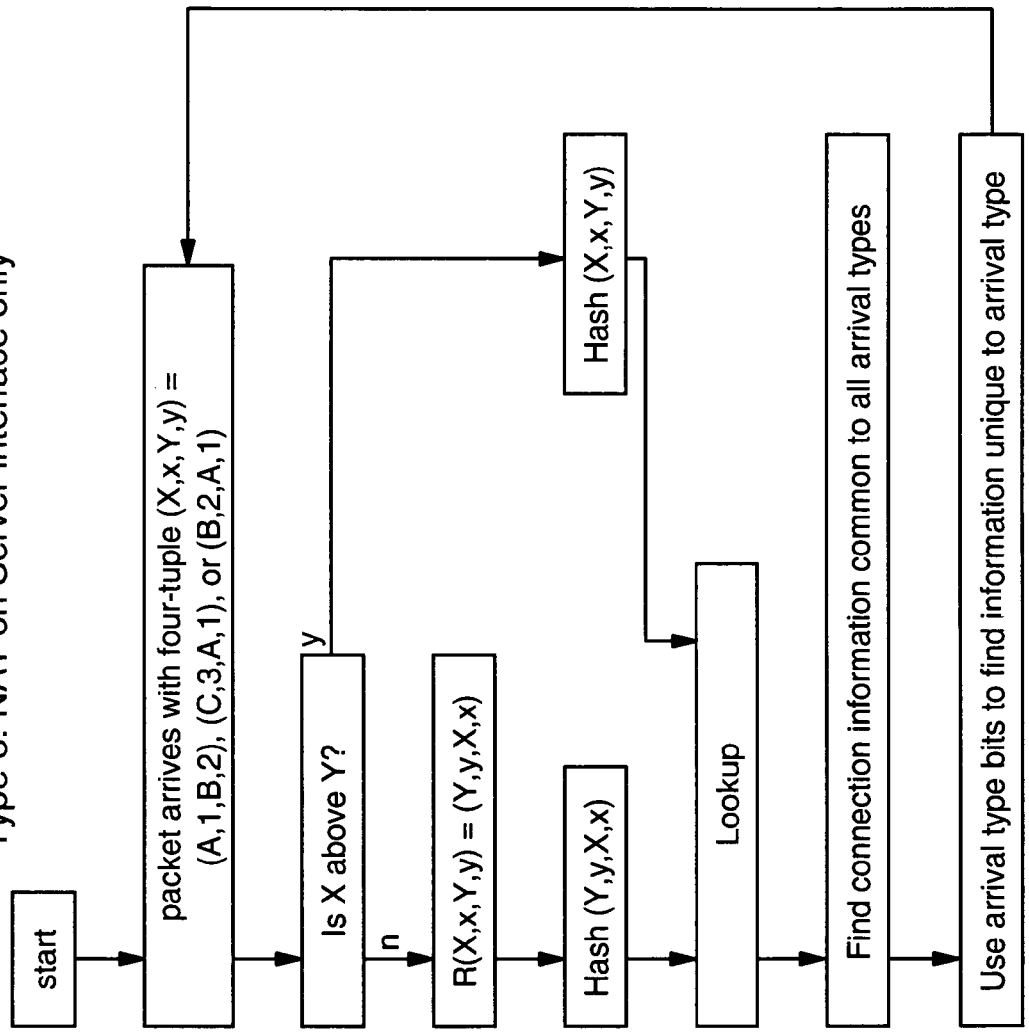
FIG. 13 shows a flowchart for processing packets, with NAT on Server interface only, in a lookup mechanism according to teachings of the present invention.
Figure 14:
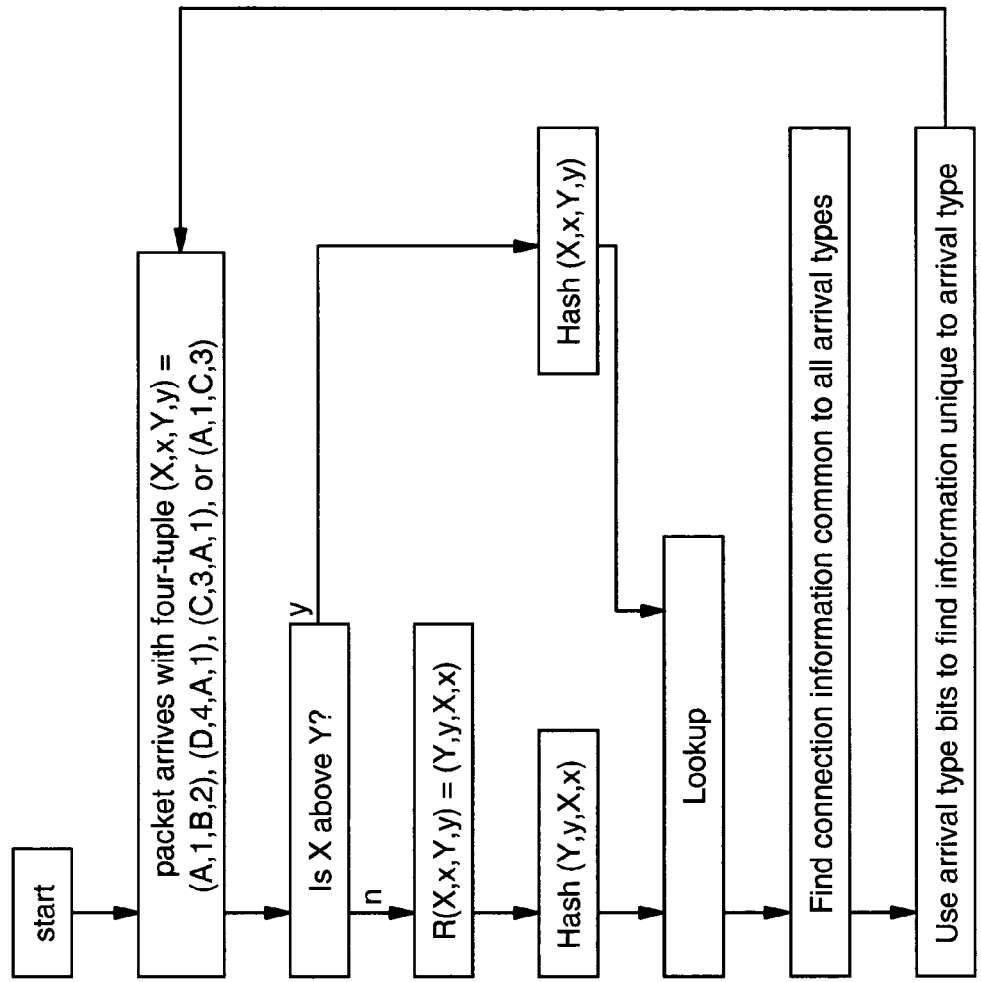
FIG. 14 shows a flowchart for processing packets, with NAT on Client and Server interface, in a lookup mechanism according to teachings of the present invention.
Figure 15:
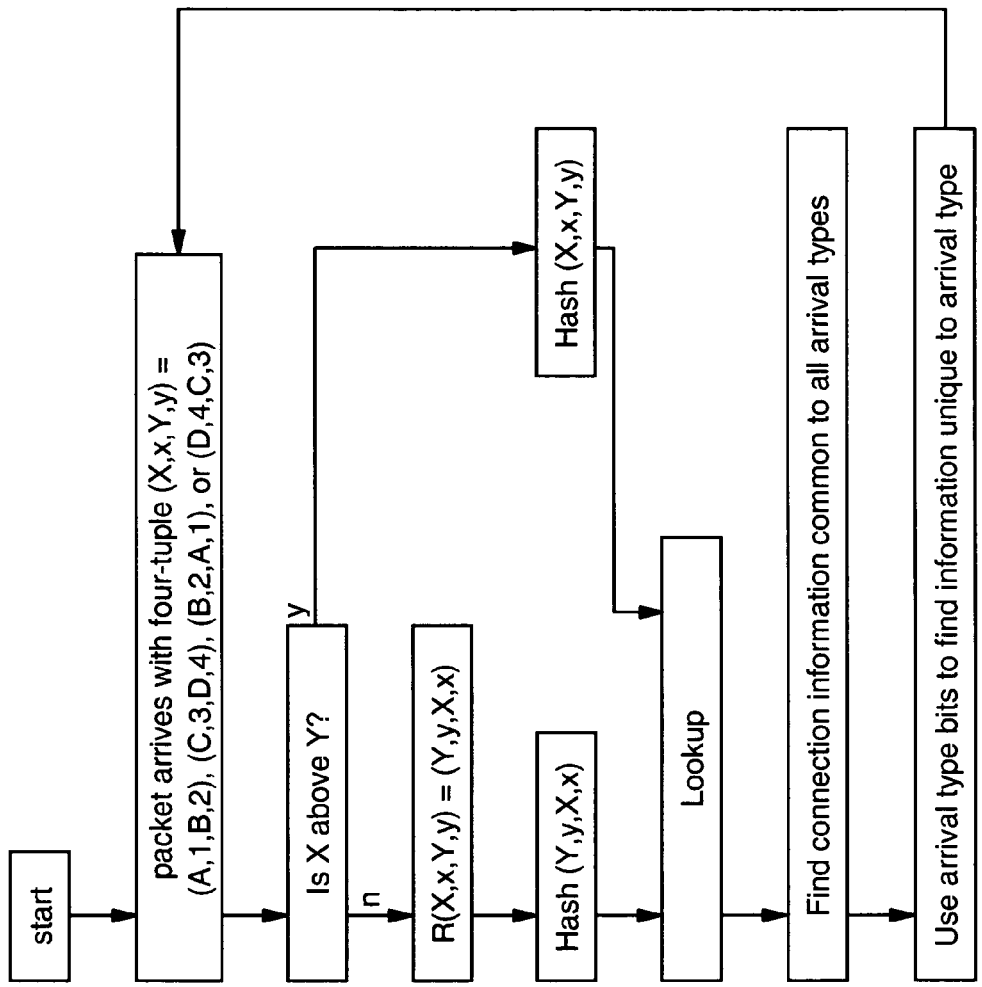
FIG. 15 shows a flowchart for processing packets, with NAT on Firewall, in a lookup mechanism according to teachings of the present invention.

As can be seen from the above the methodology adopted to process packets depends on the location of NAT. FIGS. 12 through 15 show flowcharts for processing packets with NAT at different locations. For example, FIG. 12 shows a flowchart for NAT on Client interface only, and so forth. Like FIG. 11 the flowcharts are self-explanatory and further discussion is not warranted.

The effect of the present invention in five NAT configurations can be summarized as in the following five tables. Each table lists a different NAT type. For example, Table 1 relates to Type 1, Table 2 related to Type 2, and so forth.

TABLE 1

No NAT. In this case traffic in the four arrival types in one TCP session are related as follows:

1. client to server = (A, 1, B, 2)
2. server to client = R(A, 1, B, 2) = (B, 2, A, 1)
3. firewall to client = R(A, 1, B, 2) = (B, 2, A, 1)
4. firewall to server = (A, 1, B, 2)

All four arrival type of one session have the same hash value, as determined by the present invention. In this case, the hash will point to a table entry and then to a leaf with connection information common to all four arrival types. Test of the interface on which the packet arrived (two bits) can be used to point to connection information unique to the arrival type. Direct Table efficiency is quadrupled.

TABLE 2

NAT on client interface only. In this case traffic arrival types are related as follows (showing only the relevant four entries of the five-tuple):

1. client to server = (A, 1, B, 2)
2. server to client = (C, 3, A, 1)
3. firewall to client = (C, 3, A, 1)
4. firewall to server = (A, 1, C, 3)

In this case, the four arrival types take two Direct Table (DT) slots (arrival types 2, 3, 4 have the same hash value that points to single DT slot). Test of the interface on which the packet arrived (two bits) can be used to point to connection information unique to the arrival type. Direct Table efficiency is doubled.

TABLE 3

NAT on server interface only. In this case traffic arrival types are related as follows (showing only the relevant four entries of the five-tuple):

1. client to server = (A, 1, B, 2)
2. server to client = (C, 3, A, 1)
3. firewall to client = (B, 2, A, 1)
4. firewall to server = (A, 1, B, 2)

In this case, the four arrival types take two Direct Table (DT) slots (arrival types 1, 3, 4 have the same hash value). Test of the interface on which the packet arrived (two bits) can be used to point to connection information unique to the arrival type. Direct Table efficiency is doubled.

TABLE 4

NAT on both client interface and server interface. In this case traffic arrival types are related as follows (showing only the relevant four entries of the five-tuple):

1. client to server = (A, 1, B, 2)
2. server to client = (D, 4, A, 1)
3. firewall to client = (C, 3, A, 1)
4. firewall to server = (A, 1, C, 3)

In this case, the four arrival types take three Direct Table (DT) slots (arrival types 3, 4 have the same hash value pointing to a single slot in the DT). Test of the interface on which the packet arrived (two bits) can be used to point to connection information unique to the arrival type. Direct Table efficiency is increased by 4/3.

TABLE 5

NAT in firewall
In this case traffic arrival types are related as follows (showing only the relevant four entries of the five-tuple):

1. client to server = (A, 1, B, 2)
2. server to client = (C, 3, D, 4)
3. firewall to client = (B, 2, A, 1)
4. firewall to server = (D, 4, C, 3)

In this case, the four arrival types take two Direct Table (DT) slots (arrival types 1, 3 have the same hash value, as do arrival types 2, 4). Test of the interface on which the packet arrived (two bits) can be used to point to connection information unique to the arrival type. Direct Table efficiency is doubled.

APPENDIX

Here is some simple Assembly code that accomplishes the Step S. It might be possible to optimize this code to smaller code in some contexts.

```
        ldr     w0,     SA
        ldr     w2,     DA
        ldr     r4,     SP
        ldr     r5,     DP
        cmp     w0,     w2
        ba      H
S       ldr     w6,     w0
        ldr     w0,     w2
        ldr     w2,     w6
        ldr     r6,     r4
        ldr     r4,     r5
        ldr     r5,     r6
H       [apply hash function to w0, r4, w2, r5]
```

Note that the case that w0=w2 should never occur in legitimate traffic. It is included here only for the sake of algorithmic completeness.

Also, in general, one of the two "directions" should dominate. In a preferred embodiment, an attempt as follows is made to bias the addresses so that in most exercises of the Step in the algorithm, w0 is above w2. Let us suppose there is an administrative opportunity to specify all SA values within a subnet, which is the case when NAT hides internal IP addresses from the Internet and the internal IP addresses need not be globally unique. Suppose 1. in most connections the server side is a machine within the subnet
2. in most connections, the majority of packets flow from subnet to Internet If all these conditions are met, then most of the time, the branches can be avoided if the IP addresses within the subnet are chosen to have high values as integers. In this case the above Assembly can be rewritten as follows to avoid branches most of the time.

```
        ldr     w0,     SA
        ldr     w2,     DA
        ldr     r4,     SP
        ldr     r5,     DP
        cmp     w0,     w2
        bbe     S
H       [apply hash function to w0, r4, w2, r5]
S       ldr     w6,     w0
        ldr     r8,     r4
        ldr     w0,     w2
        ldr     r4,     r5
        ldr     w2,     w6
        ldr     r5,     r8
        b       H
```

Although the present invention has been fully described by way of examples with reference to the drawings, it is to be noted that various changes and modifications will be apparent to those skilled in the art. Therefore, unless otherwise such changes and modifications depart from the scope of the present invention, they should be construed as being included therein.

What is claimed is:

1. A method for mapping packets, the method comprising:
providing, in a network device, a search facility to which packets received in said network device are to be mapped;

identifying an arrival type for each packet received as of one of N types of traffic arriving in said network device to form an identified arrival type;

marking each packet received with a respective set of bits representing the identified arrival type, wherein the respective set of bits forms a code comprising a second portion of a key;

selecting a set of field values from each packet received to form a first portion of a key;

associating the second portion of the key with the first portion of the key to form the key for each packet received;

identifying a network address translation type to form an identified network address translation type for each packet received;

performing a step calculation using the set of field values and identified network address translation type to form a step input for each packet received;

responsive to the step calculation, hashing the step input to form an index value for each packet received;

locating an entry in the search facility for each packet received using the index value; and identifying an action associated with the entry using the first portion of the key;

wherein performing a step calculation further comprises:

determining whether a source address A is greater than a destination address B;

responsive to a determination that the source address A is greater than the destination address B, the step calculation, S, is represented as S (A,1,B,2)=(A,1,B,2), wherein a 1 represents a source port and a 2 represents a destination port; and responsive to a determination that the source address A is not greater than the destination address D, the step calculation is represented as S (A,1,B,2)=R (A,1,B,2)=(B, 2,A,1), wherein R represents a reflection function.

2. The method of claim 1 wherein the code uses M bits, wherein M is greater than 1.

3. The method of claim 1 wherein stored look-up information in said search facility includes common information relating to the second portion of the key and specific information relating to the first portion of the key.

4. The method of claim 1 wherein the network device includes a firewall accelerator.

5. The method of claim 1 wherein the search facility includes a direct table and at least one Patricia Tree structure operably coupled to said direct table.

6. The method of claim 5 further including storing in leaves associated with said Patricia Tree structure information common to selected ones of said N types of traffic and information specific to at least one of the selected ones of said N types of traffic.

7. The method of claim 1 wherein N=4.

8. The method of claim 1 wherein the N types of traffic include client to server, server to client, firewall to client, and firewall to server.

9. The method of claim 1 wherein the second portion of the key includes a set of values representing a source address, a source port, a destination address, and a destination port.

10. The method claim 1 further including an absence of network address translation, wherein the step input includes:

client to server=(A,1,B,2), wherein A represents a source address, 1 represents a source port, B represents a destination address and 2 represents a destination port;

server to client=R(A,1,B,2)=(B,2,A,1), wherein the A represents the source address, the 1 represents the source port, the B represents the destination address and the 2 represents the destination port, wherein R represents a reflection function;

firewall to client=R(A,1,B,2)=(B,2,A,1) wherein the A represents the source address, the 1 represents the source port, the B represents the destination address and the 2 represents the destination port, the R represents the reflection function; and firewall to server=(A,1,B,2) wherein the A represents the source address, the 1 represents the source port, the B represents the destination address and the 2 represents the destination port, the R represents the reflection function.

11. The method of claim 1 further including network address translation on a client interface only, wherein the step input includes:

client to server=(A,1,B,2)), wherein A represents a source address, 1 represents a source port, B represents a destination address and 2 represents a destination port;

server to client=(C,3,A,1), wherein the A represents the source address, the 1 represents the source port, C represents a transform of the source address and 3 represents a transform of the source port;

firewall to client=(C,3,A,1), wherein the A represents the source address, the 1 represents the source port, the C represents the transform of the source address and the 3 represents a transform of the source port; and firewall to server=(A,1,C,3), wherein the A represents the source address, the 1 represents the source port, the C represents the transform of the source address and the 3 represents a transform of the source port.

12. The method of claim 11 further including network address translation on a server interface only, wherein the step input includes:

client to server=(A,1,B,2)), wherein A represents a source address, 1 represents a source port, B represents a destination address and 2 represents a destination port;

server to client=(C,3,A,1), wherein the A represents the source address, the 1 represents the source port, C represents a transform of the source address and 3 represents a transform of the source port;

firewall to client=(B,2,A,1) wherein the A represents the source address, the 1 represents the source port, the B represents the destination address and the 2 represents the destination port; and firewall to server=(A,1, B,2) wherein the A represents the source address, the 1 represents the source port, the B represents the destination address and the 2 represents the destination port.

13. The method of claim 1 further including network address translation on a client interface and a server interface, wherein the step input includes:

client to server=(A,1, B,2) wherein A represents a source address, 1 represents a source port, B represents a destination address and 2 represents a destination port;

server to client=(D,4,A,1) wherein the A represents the source address, the 1 represents the source port, D represents a transform of the destination address and 4 represents a transform of the destination port firewall to client=(C,3,A,1), wherein the A represents the source address, the 1 represents the source port, C represents a transform of the source address and 3 represents a transform of the source port; and firewall to server=(A,1,C,3) wherein the A represents the source address, the 1 represents the source port, C represents a transform of the source address and 3 represents a transform of the source port.

14. The method of claim 1 further including network address translation in a firewall, wherein the step input includes:
 client to server=(A,1,B,2), wherein A represents a source address, 1 represents a source port, B represents a destination address and 2 represents a destination port;
 server to client=(C,3,D,4), wherein C represents a transform of the source address, 3 represents a transform of the source port, D represents a transform of the destination address and 4 represents a transform of the destination port;
 firewall to client=(B,2,A,1), wherein the A represents the source address, the 1 represents the source port, the B represents the destination address and the 2 represents the destination port; and
 firewall to server=(D,4,C,3), wherein C represents a transform of the source address, 3 represents a transform of the source port, D represents a transform of the destination address and 4 represents a transform of the destination port.

* * * * *